Aug. 23, 1960     O. ISLANDSRUD     2,949,943
TABLE SAW WITH MEANS FOR TILTING AND RECIPROCATING
Filed May 14, 1958     2 Sheets-Sheet 1

INVENTOR.
OLA ISLANDSRUD
BY
Frederick C. Meyers
ATTORNEY

Aug. 23, 1960     O. ISLANDSRUD     2,949,943
TABLE SAW WITH MEANS FOR TILTING AND RECIPROCATING
Filed May 14, 1958     2 Sheets-Sheet 2

INVENTOR.
OLA ISLANDSRUD
BY
Frederick C. Meyers
ATTORNEY

United States Patent Office 2,949,943
Patented Aug. 23, 1960

2,949,943
TABLE SAW WITH MEANS FOR TILTING AND RECIPROCATING
Ola Islandsrud, Box 122, Warren, Minn.
Filed May 14, 1958, Ser. No. 735,233
7 Claims. (Cl. 143—47)

This invention relates to rotary power tool equipment, and more particularly to a table saw wherein the saw can be tilted and reciprocated.

It is an important object of the invention to provide a sturdy and inexpensive power tool such as a table saw or the like, wherein a swinging frame provides track means for reciprocating a rotating cutting tool and, at the same time, provides support for the table top and workpiece which are held stationary while the tool is reciprocated through the workpiece.

Another object of the invention is to provide a saw and motor carriage which can be tilted together with its frame, the carriage itself being reciprocable and also having means for independently raising and lowering the saw.

A further object of the invention is to provide a hand powered means located safely at the fore of a saw table for efficiently reciprocating the saw through the workpiece.

These and other objects and advantages of my invention will more fully appear from the following description, made in connection with the accompanying drawings, wherein like reference characters refer to the same parts throughout the several views and in which.

Figure 1:
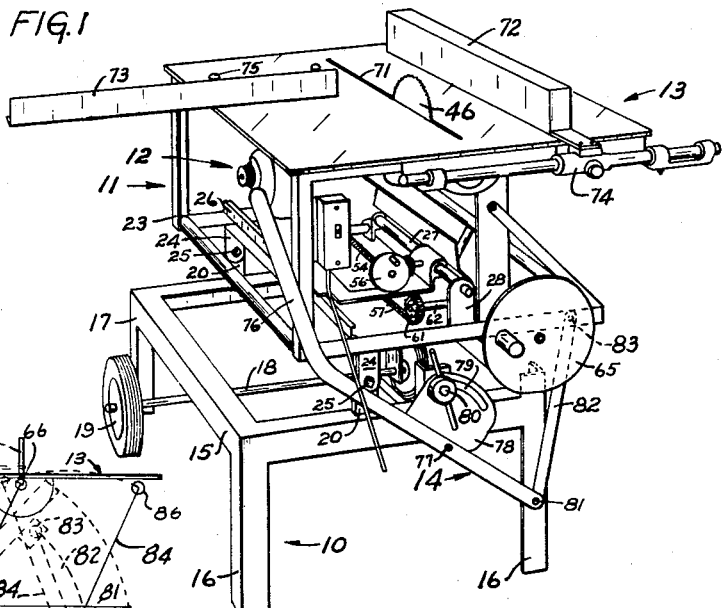
Figure 1 is a front perspective of my table saw in normal position for making right-angled cuts.
Figure 2:
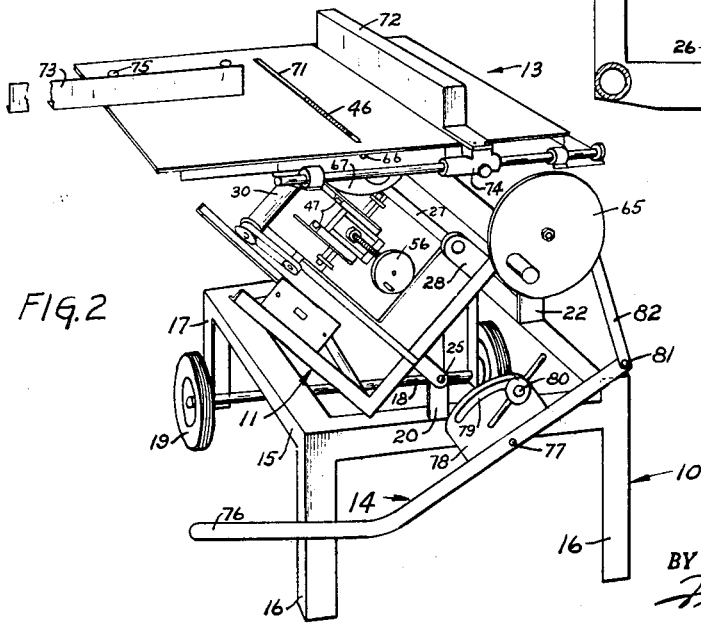
Figure 2 is a perspective view taken similar to Figure 1, showing the supporting frame tilted and the table top raised for making an angulated cut.

With continued reference to the drawing, and particularly to Figures 1 and 2, my table saw comprises generally a base 10, a supporting frame 11 pivotally mounted on the base, a rotary tool assemblage 12 reciprocable on the supporting frame, a table top 13 which is pivotally mounted to frame 11, and an adjustable linkage mechanism 14 for simultaneously effecting the pivoting of the supporting frame 11 and the rotating tool assemblage 12 supported thereon with respect to both the base 10 and the table top 13.

The base 10 is provided with an upper rigid structure 15 from which legs 16 depend at a forward position and legs 17 depend at the rear. Legs 17 may be conveniently secured to a shaft 18 upon which are rotatably mounted wheels 19 for moving the table saw from one location to another. The base 10 is also provided with certain pivot mounts and fastening elements, as follows: The upper rigid structure 15 has a pair of pivot brackets 20 secured at opposite ends of the elongated base and defining a pivot axis which is longitudinal with respect to the base 10.

Figure 4:
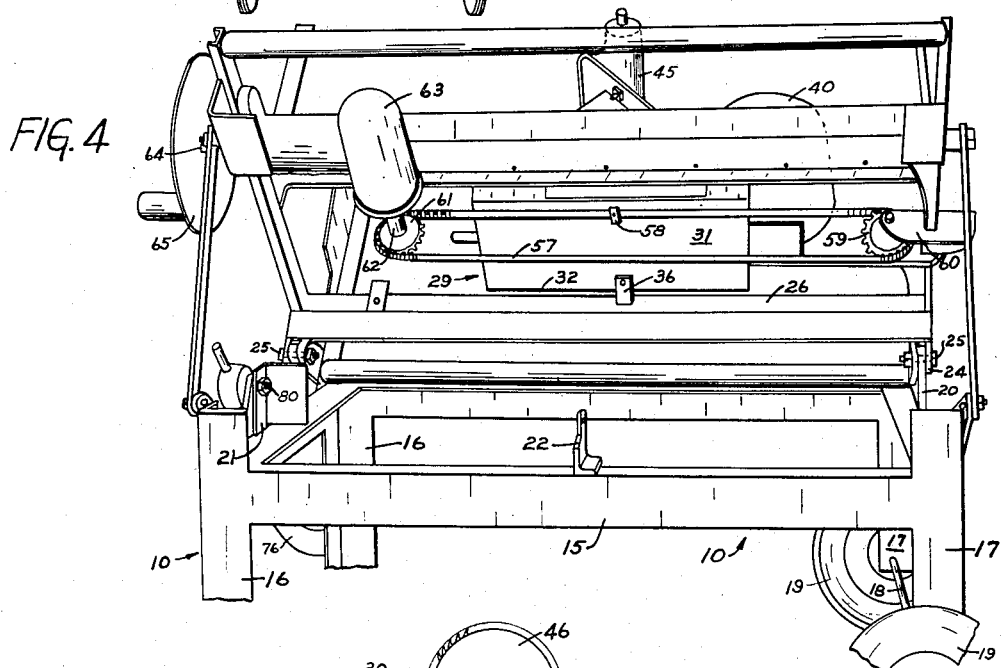
Figure 4 is a side perspective taken from the left of Figure 3, the table top being removed and other portions unessential to the view being eliminated.

Referring to Figures 2 and 4, a pivot and clamping plate 21 is rigidly secured to upper rigid structure 15 for a purpose to be disclosed hereinafter. A still further component of the base 10 is a pivot bracket 22 for maintaining the table top 13 in horizontal position as will be subsequently described.

Supporting frame 11 constitutes an outer rigid structure 23 from which depends a pair of pivot brackets 24 respectively secured to the base pivot brackets 20 by means of bolts 25, as shown. The supporting frame 11 is intended to pivot to any position lying between the horizontal position of Figure 1 and the extreme tilted position of Figure 2.

Figure 5:
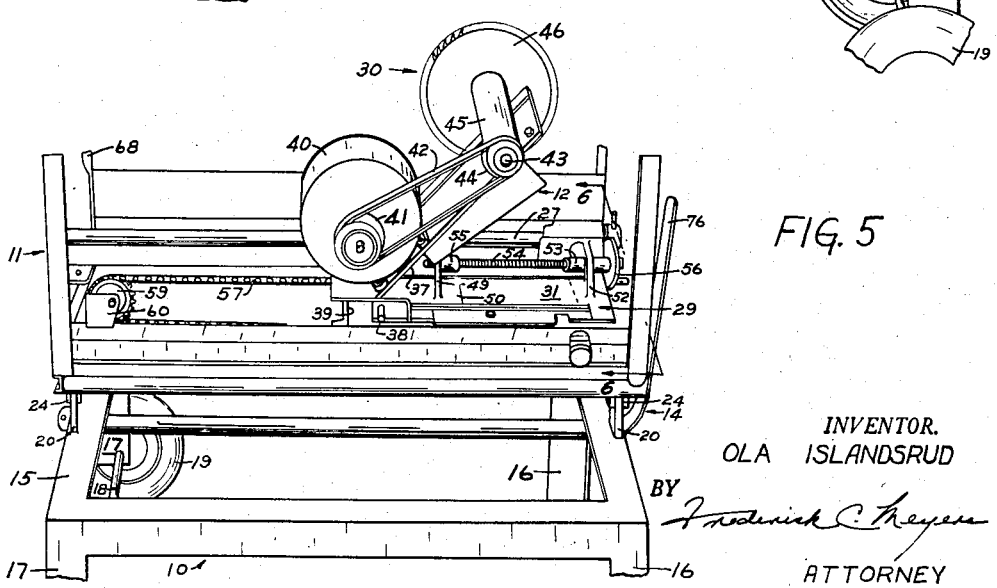
Figure 5 is a side perspective taken from the right of Figure 3, the table top being removed and unessential portions being omitted from the view.

The motorized saw assemblage 12 is mounted for reciprocation on the supporting frame and, to this end, guide means such as the parallel track 26 and rod 27 are mounted. The track 26 is secured directly to outer rigid structure 23 so as to lie parallel to the base pivot axis extending through pivot points 25 and the rod 27 lies in spaced parallel relationship thereto, being mounted on brackets 28 which are, in turn, rigidly attached to the rigid outer structure 23. The saw assemblage 12 has a carriage 29, as shown in Figures 4 and 5, which is adapted to hold the motorized saw 30 and reciprocate therewith on guide means 26 and 27 in parallel relation to the base pivotal axis upon which the supporting frame 11 may swing. Carriage 29 in turn comprises a slide plate 31, one edge 32 of which slides on the track 26, and the other edge 33 of which is provided with an upwardly extending bearing member 34 which slides on the rod 27. Screw abutment means 35 may be mounted on the bearing 34 so as to clamp the plate 31 thereto if it be desired to hold the motorized saw 30 in non-reciprocating position. A retaining member 36 may be secured to plate 31 so as to slidably abut the track 26 and prevent the plate 31 from accidentally disengaging the track 26.

Figure 6:
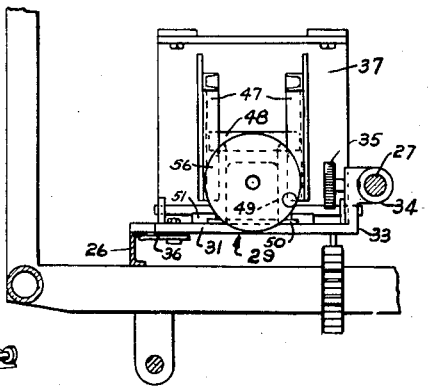
Figure 6 is an enlarged fragmentary view of the motorized saw and carriage taken from the front as viewed in Fig. 1, portions of the supporting frame being cut away to better show the hidden parts.

Referring now to Figures 5 and 6, the slide plate 31 has hingedly mounted thereon a mounting plate 37 which is pivoted at 38 adjacent the rear edge 39 of plate 31. An electric motor 40 is rigidly mounted upon the hinged plate 37 and has a drive pulley 41 which drives flexible belt 42 and thereby rotates the saw arbor 43 which carries pulley 44, as shown in Figure 5. Arbor 43 is rotatably received in the journal 45 which, in turn, is rigidly mounted to the hinged plate 37 adjacent its outer free end and a rotary tool such as the saw blade 46 is secured to arbor 43 at the end opposite pulley 44 so that saw blade 46 will remain in the same plane and at constant distance from the motor 40 when the mounting plate 37 is hingedly raised or lowered.

In order to effect the raising and lowering of the motor 40 and saw blade 46, I utilize a pair of spaced parallel guide channels 47 (Fig. 6) rigidly secured at the underside of the mounting plate 37 and extending at right angles to the axis of hinge 38 between the slide plate 31 and the mounting plate 37. A transverse slide pin 48 lies in the guide channels 47 and is secured intermediate its ends to a vertical bracket 49 which, in turn, has a base 50 which is slidably mounted on the slide plate 31. The base 50 is guided and retained between the spaced parallel tracks 51, as shown in Figures 5 and 6. An upstanding bracket 52 is secured to the slide plate 31 and has a threaded member 53 rigidly secured thereto and adapted to receive the screw rod 54, as shown in Fig. 5. Screw rod 54 is journaled against longitudinal relative movement at its outer end within the bearing 55 which, in turn, is rigidly secured to the bracket 49 and in alignment with the threaded member 53. A crank wheel 56 is secured to the opposite end of the screw rod 54 and extends forwardly of the bracket 52 for convenient manual adjustment of the height of the saw blade or other rotary cutting tool 46 in its mounted relationship with the hinged mounting plate 37. When the crank wheel 56 is turned in one direction, the base 50 and its pin 48 will travel longitudinally in one direction to raise the entire saw assemblage 30 and, when moved in the opposite direction, will lower the same. It will be noted that the adjustment of the height of saw blade 46 is entirely independent of the position of the slide plate 31 and determines the relative height of the saw blade with respect to the slide plate 31 irrespective of its longitudinal position with respect to supporting frame 11. The plane of the saw blade 46 always has a constant angular relationship with respect to the entire supporting frame 11 whether it is adjusted for height or adjustably angulated together therewith.

In order to effect forward and rearward reciprocation of the rotating tool assemblage 12, I employ an endless chain 57 as best seen in Figures 4 and 5. The endless chain 57 is secured at 58 to the underside of the slide plate 31 and lies in a plane which bisects the slide plate 31 in a line parallel to the pivotal base axis through pivots 25. Endless chain 57 is trained about an idler sprocket 59 which in turn is journaled in the bearing 60 which is secured to the outer structure 23 of the supporting frame 11. At the opposite end of the endless chain 57 is a drive sprocket 61 which is secured to the output shaft 62 of the right angle gear box 63. Gear box 63, in turn, is secured to the rigid structure 23 of a supporting frame 11 and has a forwardly extending input shaft 64 to which is secured at a position forwardly of frame 11 a crank wheel 65. When the crank wheel is rotated in one direction, the chain 57 will cause the entire rotary tool assemblage 12 to slide in one direction and, when rotated oppositely, will cause the assemblage to reciprocate in the opposite direction.

Figure 3:
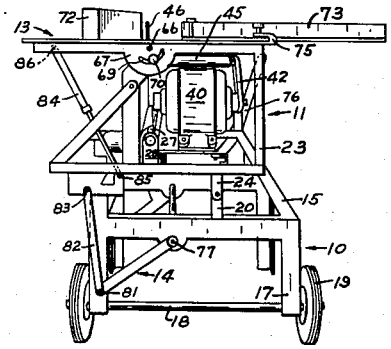
Figure 3 is a rear view of my table saw.
Figure 8:
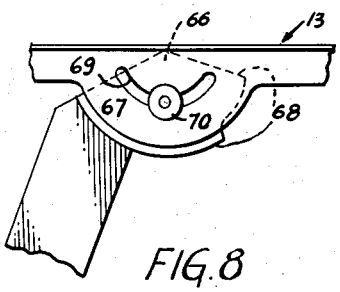
Figure 8 is an enlarged fragmentary view showing the pivotal mounting of the table element to the supporting frame.

The table top 13 is pivotally mounted at 66, as shown from the fore in Fig. 2 and the rear in Figure 3, a pivot plate 67 being rigidly secured respectively at the fore and rear of the table top 13 and pivotally mounted on the mating pivot plates 68 secured at an upper position on the supporting frame 11, as shown in Figure 5. Each of the pivot plates 67 may be provided with arcuate slots 69 (Fig. 3) through which a locking screw 70 extends in threaded engagement with the corresponding pivot plate 68. Table top 13 is additionally provided with an elongate slot 71 which is adapted to receive the saw blade 46 in upwardly projected relation therethrough and is provided with the usual rails 72 and 73. These rails may be suitably, adjusted by guiding and clamping arrangements 74 and 75 respectively, as shown in Figures 1 and 2. The guide rails are intended to abut and maintain workpieces such as lumber and the like in proper relationship with slot 71 during the sawing operation.

In order to effect the angulation of the supporting frame 11, I employ linkage mechanism 14, as follows: lever arm 76 is pivoted at 77 to the rigid structure 15 at a forward position thereof in full clearance with the legs 16 on base 10. A locking plate 78 (Figs. 1 and 2) is secured to the arm 76 and is provided with slot 79 which receives the locking screw 80 threadably mounted in the pivot plate 21 (Fig. 4) forming a part of the base structure 10. Thus the arm 76 can be pivoted and retained at any position from that shown in Figure 1 to a lower extreme position shown in Figure 2. At the end of pivot arm 76 is a pivot connection 81 with the link 82 which, in turn, is pivoted at 83 to a lower position on the rigid structure 23 of the supporting frame 11.

In order to maintain the table top 13 in horizontal relation irrespective of the angulation of saw blade 46, I utilize a pivotal brace 84 as shown in Figure 3, this brace being pivoted at 85 at its lower extremity to the bracket 22 previously mentioned as a part of the base 10. At its upper position, the pivotal brace 84 is pivoted at 86 to the table top 13.

Figure 7:
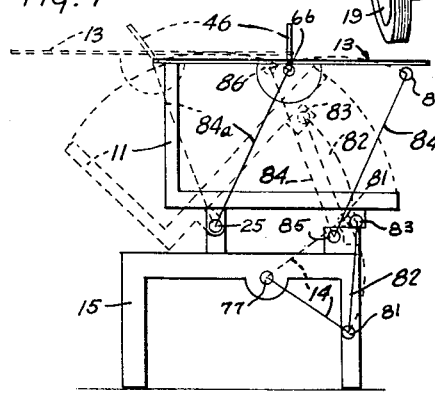
Figure 7 is a diagrammatic view of the lever and pivot arrangement in my saw table illustrating the shifting of position afforded by the supporting frame and table top.

The operation of my table saw will be evident from the foregoing, but may be briefly summarized with reference to Figure 7. When the arm 76 is depressed, the pivot 81 will be raised, thus causing the link 82 to push upwardly on pivot 83. The entire supporting frame 11 will thus be pivoted in a counter-clockwise direction as viewed in Figure 7, about the pivotal base axis 25 and tilting the entire rotary tool assemblage therewith. The table top 13 will be raised and also moved to the left about its pivot support 66 which lies in the same plane as saw blade 46 and the table top surface. The table top 13 maintains its parallel relation to the base 10 throughout this movement because of the pivotal brace 84 which moves in parallel relation with the aforementioned pivotal linkages on the supporting frame. Line 84a has been drawn between the pivot points 25 and 66 to show the parallel movement between line 84a and the pivot brace 84. The saw blade 46 will thus be angulated with respect to the surface of table top 13 without disturbing the adjustability and reciprocating ability of the motorized saw within the supporting frame structure. Thus, the saw 46, after having been adjusted for angulation by means of the pivot arm 76 may be retained by locking the angulated position with locking screw 80. The proper height of the saw blade 46 can then be adjusted by the crank wheel 56 and the table saw will then be in readiness to effect a cut. The crank wheel 65 is rotated so as to move the slide plate 31 to one end or the other of slot 71 and a workpiece may then be positioned against one or both of the rails 72 and 73. The crank wheel 65 is then rotated in the opposite direction to cause the saw blade 46 to pass through the workpiece and effect the desired depth and angle of cut.

It will be observed that all of the adjustments can be safely effected at the front of the saw and that adjustment is simply and rapidly made by means of my novel elements, their pivotal connections and linkages therebetween.

It will, of course, be understood that various changes may be made in the form, details, arrangements and proportions of the parts without departing from the scope of my invention as set forth in the appended claims.

What I claim is:

1. A powered rotary table saw comprising, a generally rectangular base, a supporting frame pivotally mounted on said base on an axis longitudinally thereof, a motorized saw carried by said frame and reciprocable in a plane parallel to the pivotal base axis, a table top pivotlly mounted on the supporting frame on an axis parallel to the pivotal base axis above the motorized saw and having a longitudinal slot adapted to receive the saw upwardly projected therethrough for longitudinal reciprocation, and a connecting link secured to said base and said table top and constituting, together with said supporting frame, a parallelogram linkage for the table top whereby the table top will remain horizontal although supported at varying levels.

2. A powered rotary table saw comprising, a generally rectangular base, a supporting frame pivotally mounted on said base on an axis longitudinally thereof, a motorized saw carried by said frame and reciprocable in a plane parallel to the pivotal base axis, a table top pivotally mounted on the supporting frame on an axis parallel to the pivotal base axis above the motorized saw and having a longitudinal slot adapted to receive the saw upwardly projected therethrough for longitudinal reciprocation therein, a connecting link secured to said base and said table top and constituting, together with said supporting frame, a parallelogram linkage for the table top, and means adapted to adjustably hold the supporting frame at a multiplicity of angular positions with respect to said base axis, the table top remaining in horizontal position.

3. The structure set forth in claim 2, wherein the means adapted to adjustably hold the supporting frame constitutes a lever arm pivotally connected to said base and having a link arm pivotally interconnecting said supporting frame and said lever arm for effecting the angulation of the supporting frame.

4. A powered rotary table saw comprising, a generally rectangular base, a supporting frame pivotally mounted on said base on an axis disposed lengthwise thereof, said supporting frame having guide means disposed in parallel relation to the pivotal base axis, a carriage slidably carried by the guide means, a motorized saw mounted on said carriage and reciprocable therewith in a plane parallel to the pivotal base axis, a table top pivotally mounted on the supporting frame on an axis also parallel to the pivotal base axis and above the motorized saw and carriage, said table top having a longitudinal slot adapted to receive the saw upwardly projected thereto for longitudinal reciprocation therein, and a connecting link secured to said base and said table top and constituting, together with said supporting frame, a parallelogram linkage for the table top whereby the table top will remain horizontal although supported at varying levels.

5. A powered rotary table saw comprising, a generally rectangular base, a supporting frame pivotally mounted on said base on an axis longitudinally thereof, guide means on said supporting frame disposed in parallel relation with respect to the pivotal base axis, a slide plate mounted in the guide means, a mounting plate hingedly secured to said slide plate, a motorized saw mounted on the mounting plate and adapted to be hingedly raised and lowered with respect thereto, means adapted to reciprocate the slide plate together with the motorized saw, a table top pivotally mounted on the supporting frame on an axis parallel to the pivotal base axis above the motorized saw and having a longitudinal slot adapted to receive the saw upwardly projected therethrough for longitudinal reciprocation therein, a connecting link secured to said base and said table top and constituting, together with said supporting frame, a parallelogram linkage for the table top, and means adapted to adjustably hold the supporting frame at a multiplicity of angular positions with respect to said base axis and the table top, the table top remaining in horizontal position.

6. A powered rotary table saw comprising, a generally rectangular base, a supporting frame pivotally mounted on said base on an axis longitudinally thereof, a motorized saw carried by said frame and reciprocable in a plane parallel to the pivotal base axis, an elongated endless chain mounted adjacent said motorized saw and being secured thereto, a manually operable crank and drive mechanism for moving said endless chain and the motorized saw in guided relation on said frame, a table top pivotally mounted on the supporting frame on an axis parallel to the pivotal base axis above the motorized saw and having a longitudinal slot adapted to receive the saw upwardly projected therethrough for longitudinal reciprocation therein, and a connecting link secured to said base and said table top and constituting, together with said supporting frame, a parallelogram linkage for the table top whereby the table top will remain horizontal although supported at varying levels.

7. A powered rotary table saw comprising, a generally rectangular base, a supporting frame pivotally mounted on said base on an axis longitudinally thereof, a motorized saw having a cutting blade carried by said frame and reciprocable in a plane parallel to the pivotal base axis, a table top pivotally mounted on the supporting frame on an axis parallel to the pivotal base axis above the motorized saw and having a longitudinal slot adapted to receive said cutting blade upwardly projected therethrough for longitudinal reciprocation therein, a connecting link between said table and said base and constituting, together with said supporting frame, a parallelogram linkage for maintaining the table top in parallel relation thereto although supported at varying levels, and means adapted to adjustably hold the supporting frame at a multiplicity of angular positions with respect to the pivotal base axis and to the table top.

References Cited in the file of this patent

UNITED STATES PATENTS

| | | |
|---|---|---|
| 1,586,494 | Walker | May 25, 1926 |
| 1,816,069 | Bennett | July 28, 1931 |
| 2,062,969 | Dutcher | Dec. 1, 1936 |
| 2,188,827 | Bradfield | Jan. 30, 1940 |
| 2,601,876 | Anderson | July 1, 1952 |
| 2,644,491 | Abraham | July 7, 1953 |
| 2,703,115 | Beagle | Mar. 1, 1955 |
| 2,707,500 | Walmer | May 3, 1955 |
| 2,811,994 | Dooley | Nov. 5, 1957 |

FOREIGN PATENTS

| | | |
|---|---|---|
| 10,460 of 1886 | Great Britain | Aug. 16, 1886 |
| 65,226 | Denmark | Dec. 16, 1946 |